United States Patent
Mavinahally (10) Patent No.: US 7,104,526 B2
(45) Date of Patent: Sep. 12, 2006

(54) CARBURETOR WITH INTERMEDIATE THROTTLE VALVE BLOCKING POSITION

(75) Inventor: Nagesh S. Mavinahally, Anderson, SC (US)

(73) Assignee: Homelite Technologies, Ltd., Hamilton (BM)

( * ) Notice: Subject to any disclaimer, the term of this patent is extended or adjusted under 35 U.S.C. 154(b) by 174 days.

(21) Appl. No.: 10/459,046

(22) Filed: Jun. 10, 2003

(65) Prior Publication Data

US 2004/0251564 A1    Dec. 16, 2004

(51) Int. Cl.
F02M 7/26 (2006.01)
F02M 23/09 (2006.01)

(52) U.S. Cl. .................. 261/46; 123/73 PP; 261/47; 261/DIG. 1

(58) Field of Classification Search .............. 261/23.2, 261/23.3, 46, 47, DIG. 1; 123/73 PP
See application file for complete search history.

(56) References Cited

U.S. PATENT DOCUMENTS

| | | | | |
|---|---|---|---|---|
| 1,202,331 A | * | 10/1916 | Tatom ...................... 261/156 |
| 1,330,024 A | * | 2/1920 | Hodges ..................... 123/344 |
| 2,102,846 A | * | 12/1937 | Hunt ........................ 261/39.3 |
| 3,990,420 A | | 11/1976 | Bitterman et al. ....... 123/119 D |
| 4,073,278 A | * | 2/1978 | Glenn ...................... 123/198 F |
| 4,075,985 A | | 2/1978 | Iwai ......................... 123/73 A |
| 4,078,025 A | * | 3/1978 | Kato ........................ 261/41.5 |
| 5,682,845 A | | 11/1997 | Woody ..................... 123/73 A |
| 6,101,991 A | | 8/2000 | Glover ..................... 123/73 PP |
| 6,135,072 A | | 10/2000 | Kishita ...................... 123/73 A |
| 6,186,482 B1 | * | 2/2001 | Nomura ....................... 261/43 |
| 6,216,650 B1 | | 4/2001 | Noguchi ................... 123/73 A |
| 6,298,811 B1 | | 10/2001 | Sawada et al. .......... 123/73 A |
| 6,334,606 B1 | | 1/2002 | Tobinai et al. ............ 261/23.3 |
| 6,347,787 B1 | | 2/2002 | Tobinai et al. ............ 261/23.3 |
| 6,349,925 B1 | | 2/2002 | Tobinai et al. ............ 261/23.3 |
| 6,418,891 B1 | * | 7/2002 | Kobayashi .............. 123/73 PP |
| 6,585,235 B1 | * | 7/2003 | Pattullo ..................... 261/44.8 |
| 6,662,767 B1 | * | 12/2003 | Nonaka ..................... 123/73 A |
| 6,688,585 B1 | * | 2/2004 | Braun et al. ................ 261/35 |
| 6,749,180 B1 | * | 6/2004 | Durr et al. ................ 261/23.3 |
| 2001/0020454 A1 | * | 9/2001 | Kobayashi ............... 123/73 A |
| 2003/0192493 A1 | * | 10/2003 | Yuasa et al. ............. 123/73 PP |

FOREIGN PATENT DOCUMENTS

JP        55-60657    *  5/1980  ................. 261/46

* cited by examiner

*Primary Examiner*—Richard L. Chiesa
(74) *Attorney, Agent, or Firm*—Brinks Hofer Gilson & Lione (57) ABSTRACT

A carburetor including a frame having a first air/fuel channel and a second air channel; and a throttle valve assembly connected to the frame and having two valve sections. Each valve section is located in a respective one of the channels. A second one of the valve sections has an air bleed hole therethrough. The second valve section is movable relative to the frame from a first idle position to a second intermediate closed position and then to a third open position at a wide open throttle (WOT). The air bleed hole allows flow through the second channel at the first idle position, but does not allow flow through the second channel when the second valve section is at the second intermediate closed position.

13 Claims, 9 Drawing Sheets

CARBURETOR WITH INTERMEDIATE THROTTLE VALVE BLOCKING POSITION

BACKGROUND OF THE INVENTION

1. Field of the Invention

The present invention relates to internal combustion engines and, more particularly, to a carburetor.

2. Brief Description of Prior Developments

U.S. Pat. No. 6,347,787 discloses a carburetor with two passages and two valves. The valves are connected by gears for different motions relative to each other. U.S. Pat. No. 6,216,650 discloses a stratified engine with a carburetor and an ON/OFF valve. U.S. Pat. No. 6,349,925 discloses a carburetor with an air valve shaft and a throttle valve shaft movably coupled to each other.

It has been observed that when a large size main jet is used in a double barrel carburetor, the hydrocarbon emission is very high. When a small size jet or the needle is adjusted for low emission at idle, the acceleration may become unsatisfactory. There is a desire to provide a carburetor for a stratified engine which can allow air to flow through an air channel at idle and at wide open throttle (WOT), but which can block flow through the air channel at a predetermined intermediate position or range.

SUMMARY OF THE INVENTION

In accordance with one aspect of the present invention, a carburetor is provided including a frame having a first air/fuel channel and a second air channel; and a throttle valve assembly connected to the frame and having two valve sections. Each valve section is located in a respective one of the channels. A second one of the valve sections has an air bleed hole therethrough. The second valve section is movable relative to the frame from a first idle position to an intermediate closed position and then to a third open position at a wide open throttle (WOT). The air bleed hole allows flow through the second channel at the first idle position, but does not allow flow through the second channel when the second valve section is at the intermediate closed position.

In accordance with another embodiment, a two-stroke internal combustion engine is provided having a frame with a cylinder, a piston movable in the cylinder, and a carburetor connected to the frame, the carburetor comprising a first channel for supplying an air/fuel mixture to the engine, and a second channel for supplying air to the engine, a throttle valve assembly for at least partially opening and closing the channels, and a choke valve assembly. The throttle valve assembly comprises means for substantially blocking air flow to the engine through the second channel at an intermediate position of the valve assembly located between an idle position of the throttle valve assembly in which air can at least partially flow through the second channel and a wide open throttle (WOT) position of the throttle valve assembly in which air can at least partially flow through the second channel.

In accordance with one method of the present invention, a method of supplying air and an air/fuel mixture through a carburetor in an internal combustion engine is provided comprising steps of locating a throttle valve assembly of the carburetor at an idle position, wherein air is allowed to flow through an air channel of the carburetor through an air bleed hole in the throttle valve assembly, and wherein the air/fuel mixture is allowed to flow through an air/fuel channel of the carburetor; moving the throttle valve assembly to an intermediate position, wherein air is substantially prevented from flowing through the air channel, and wherein the air/fuel mixture is allowed to flow through the air/fuel channel; and moving the throttle valve from the intermediate position towards a wide open throttle position wherein air is allowed to flow through the air channel through the throttle valve assembly.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
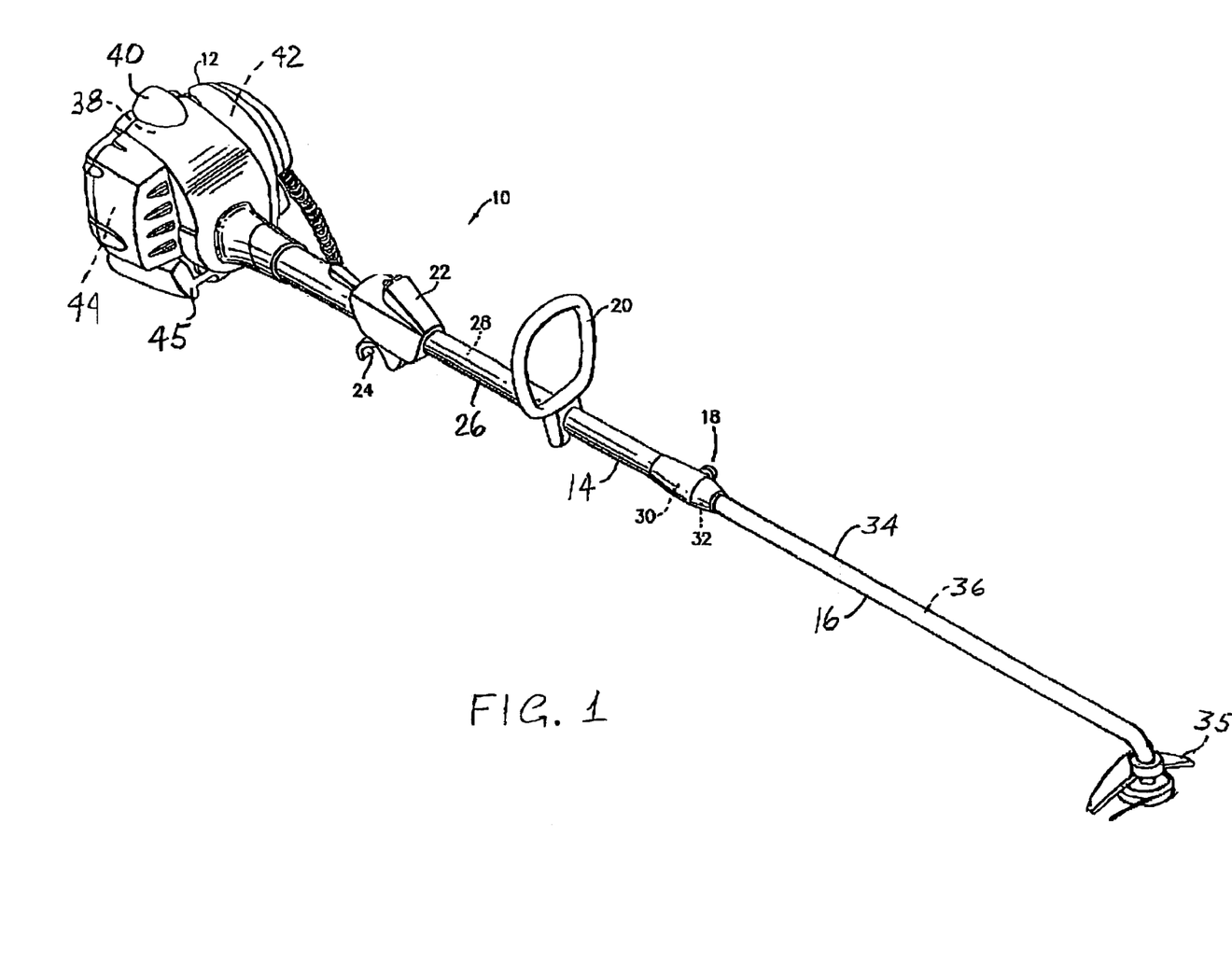
FIG. 1 is a perspective view of a power tool having an internal combustion engine incorporating features of the present invention.

Referring to FIG. 1, there is shown a perspective view of a motorized power tool 10 incorporating features of the present invention. Although the present invention will be described with reference to the exemplary embodiments shown in the drawings, it should be understood that the present invention can be embodied in many alternate forms of embodiments. In addition, any suitable size, shape or type of elements or materials could be used.

The power tool 10 in the embodiment shown is a string trimmer. However, in alternate embodiments, features of the present invention could be used in any suitable type of power tool, such as a hedge trimmer, a chain saw, a blower/vac, etc. In addition, features of the present invention could be used in any suitable type of two stroke internal combustion engine or carburetor for such an engine.

The power tool 10 generally comprises a motor 12, a first boom member 14, a second boom member 16 and a coupling system 18. However, in alternate embodiments, features of the present invention could include additional or alternative components then those described below. The motor 12, in the embodiment shown, comprises an internal combustion engine.

The first boom member 14 extends from the front end of the motor 12. The tool includes a front handle 20 and a user control 22 attached to the front boom member 14. However, in alternate embodiments, any suitable type of handle system could be provided. The user control 22 includes a throttle trigger 24. However, in alternate embodiments, any suitable type of user control could be provided. The first boom member 14 generally comprises a straight tubular frame 26 and a first rotatable drive shaft 28 extending through the frame 26. In an alternate embodiment, the frame 26 could have a non-straight shape. The first rotatable drive shaft 28 is connected to an output from the motor 12 and extends to a front end 30 of the first boom member 14.

The coupling system 18 is used to connect a rear end 32 of the second boom member 16 to the front end 30 of the first boom member 14. The second boom member or working end assembly 16 includes a tubular frame 34, a second rotatable drive shaft 36, and a working end 35, such as a string trimmer head, located at a distal, front end of the tubular frame 34. The coupling system 18 comprises the features of the coupling system described in U.S. patent application Ser. No. 10/261,567 filed Sep. 30, 2002, now U.S. Pat. No. 6,977,633, which is hereby incorporated by reference in its entirety.

Figure 2:
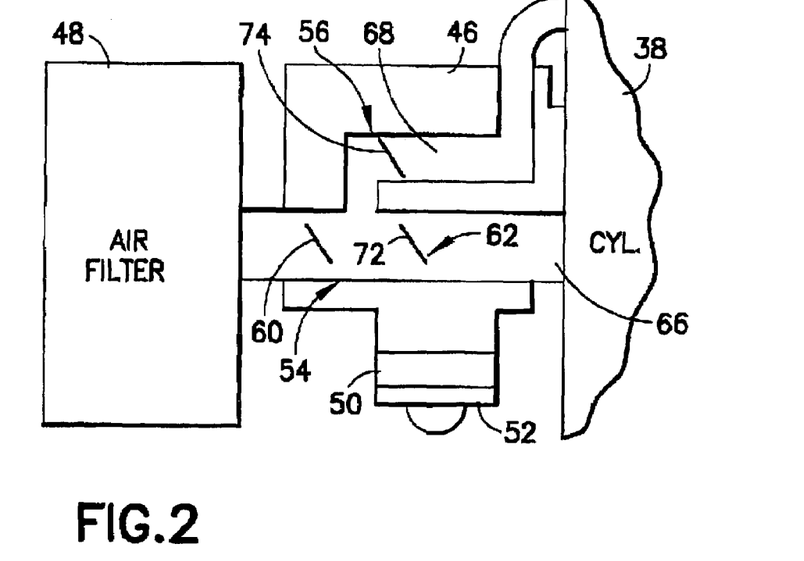
FIG. 2 is a partial diagrammatic view of portions of the internal combustion engine of the power tool shown in FIG. 1.

The motor 12 generally comprises a cylinder 38 connected to a crankcase, a piston and crankshaft, an ignition system including a spark plug boot 40, a fuel supply system 42, a muffler 44, and a starter (not shown). The motor 12 could comprise additional or alternative components. Referring also to FIG. 2, the fuel supply system 42 (see FIG. 1) includes a fuel tank 45 (see FIG. 1) and a fuel and air supply unit 46 connected to the fuel tank by a fuel supply line. The fuel and air supply unit 46 is connected to a side of the cylinder 38. An air filter 48 is connected to an opposite side of the fuel and air supply unit 46.

Figure 3:
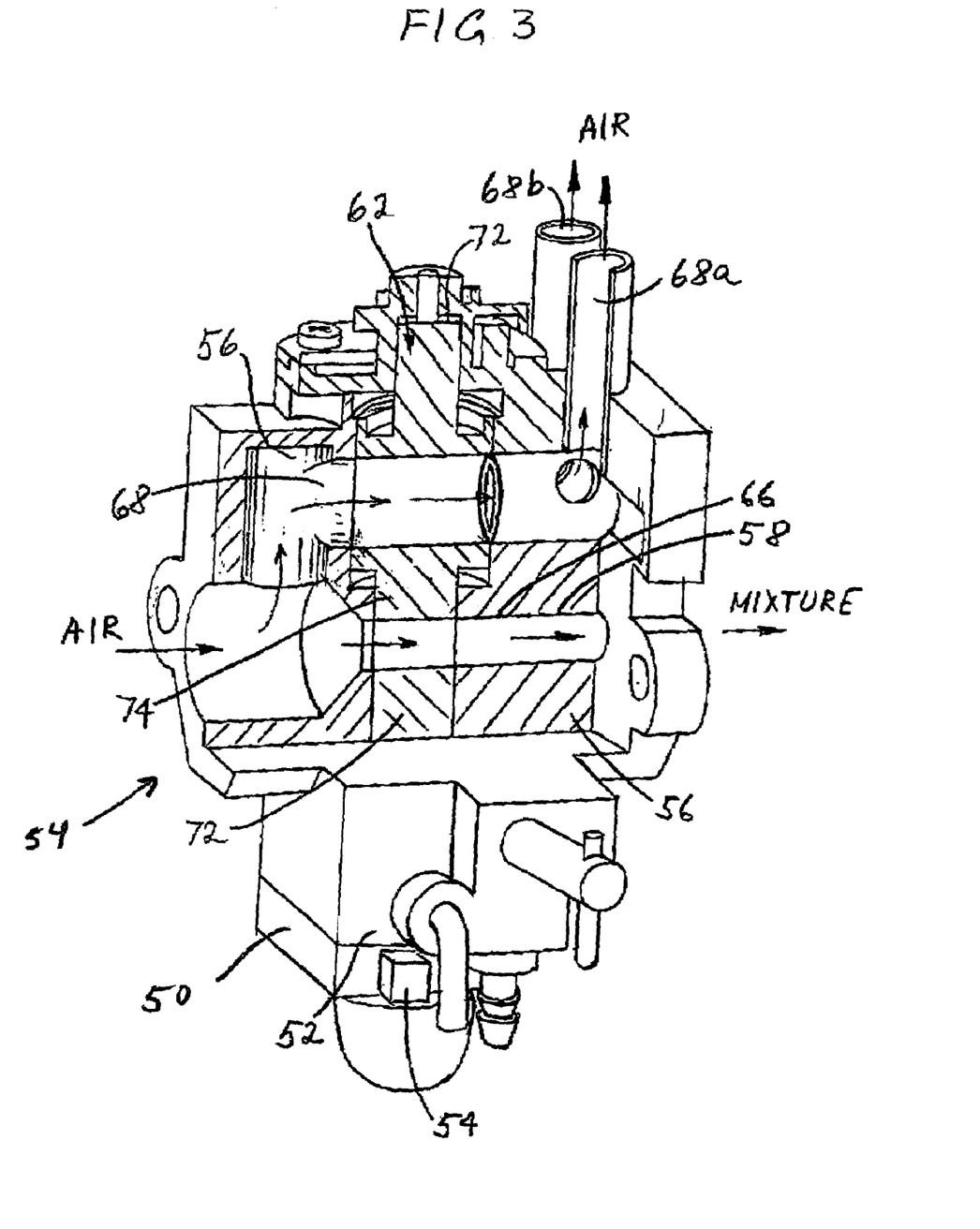
FIG. 3 is a partial cross sectional view of a fuel and air supply unit of the engine shown in FIG. 2.

Referring also to FIG. 3, the fuel and air supply unit 46 generally comprises a fuel pump 50, a fuel metering system 52, a carburetor, and a cylinder air supply channeling system 54. Fuel is supplied by the fuel pump 50 and fuel metering system 52 to the mixture passage 58 of the carburetor 54. The carburetor 54 includes a choke valve 60 and a throttle valve assembly 62. The carburetor 54 comprises a frame 64 with a first air/fuel channel 66 and a second air channel 68. The second air channel 68 bifurcates into two separate channels 68a, 68b at the end of the second air channel 68. However, in alternate embodiments, the second air channel 68 might not bifurcate or might become more than two channels at its end.

Figure 4:
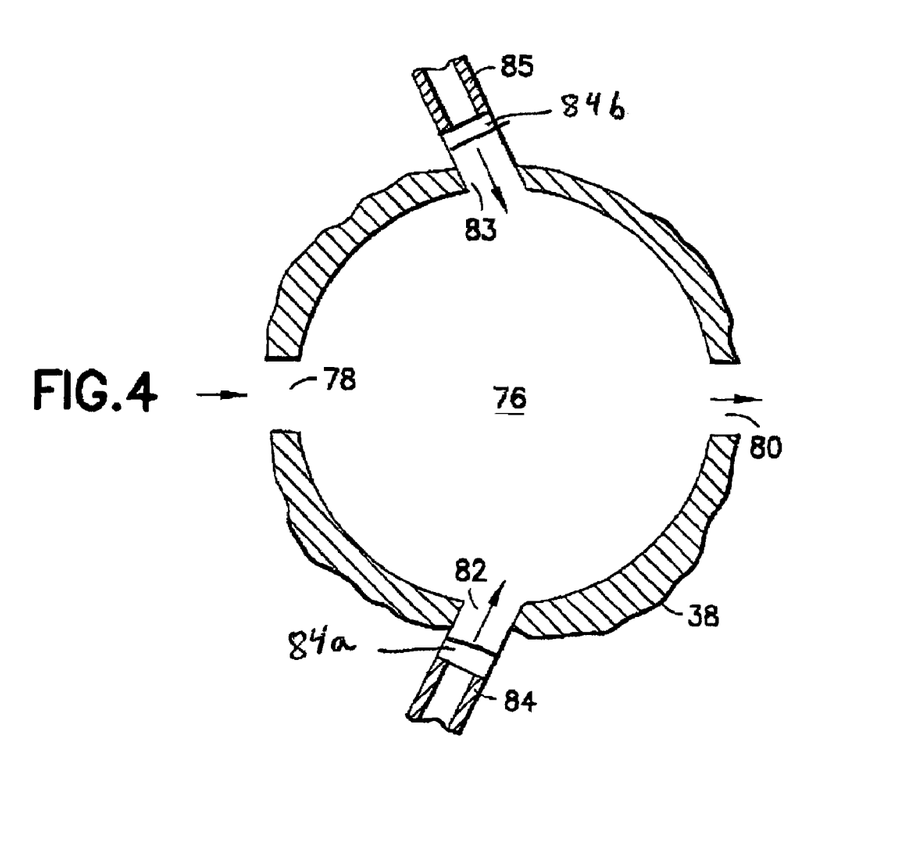
FIG. 4 is a diagrammatic partial cross sectional view of the cylinder of the engine shown in FIG. 2.

Referring also to FIG. 4, the outlets of the two separate channels 68a, 68b are connected to portions of the cylinder 38. The cylinder 38 comprises an area 76 which the piston moves in, a fuel and air mixture inlet 78, an exhaust outlet 80, and two scavenging ports 82, 83. The scavenging ports are adapted to selectively provide fluid communication between the crankcase and an area above the piston as the piston moves up and down in the cylinder 38. In other words, the piston can open and close the scavenging ports 82, 83 in the combustion area above the piston as the piston moves up and down. The scavenging ports 82, 83 allow compressed air followed by the charge from the crankcase to be pushed out the scavenging ports to an area above the piston.

The two separate air channels 68a, 68b are connected through one-way valves 84a, 84b to the tops of the scavenging ports 82, 83 by conduits 84, 85. Thus, air passing through the air channel 68 of the carburetor 54 can enter the area 76 of the cylinder 38 at the top ends of the scavenging ports 82, 83. In an alternate embodiment, air from the air channel 68 could enter the cylinder 38 at any suitable location(s).

Figure 5:
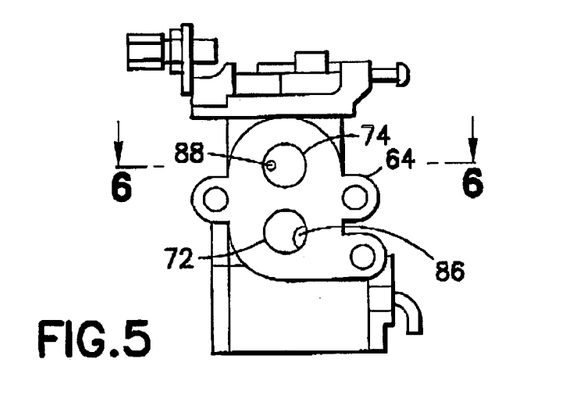
FIG. 5 is an elevational view of the inlet side of the fuel and air supply unit shown in FIG. 3 with the throttle valve assembly at an idle position.
Figure 6:
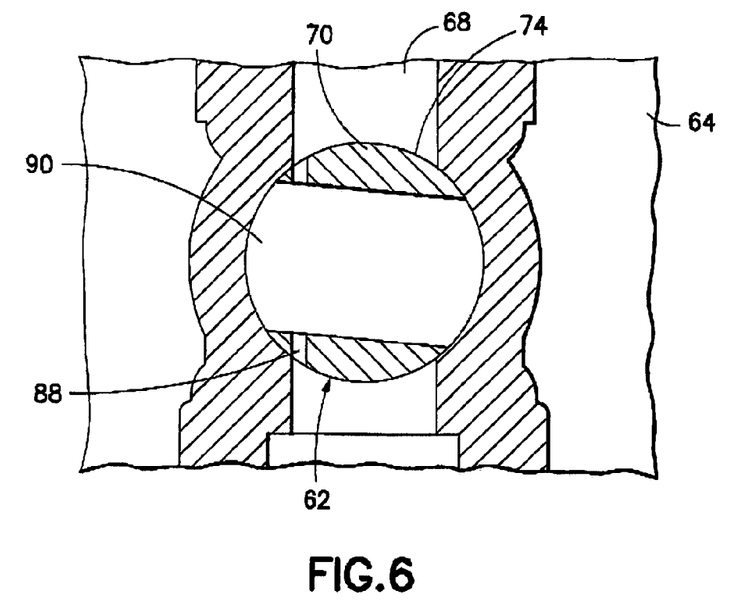
FIG. 6 is a cross sectional view of the fuel and air supply unit shown in FIG. 5 taken along line 6—6.

The throttle valve assembly 62 generally comprises a shaft 70 rotatably mounted in the frame 64 of the carburetor 54. The shaft 70 comprises a first valve section 72 and a second valve section 74. Referring also to FIGS. 5 and 6, the first valve section 72 is located at the air/fuel channel 66. The first valve section 72 intersects the air/fuel channel 66. The first valve section 72 comprises a through hole 86 therethrough.

Figure 7:
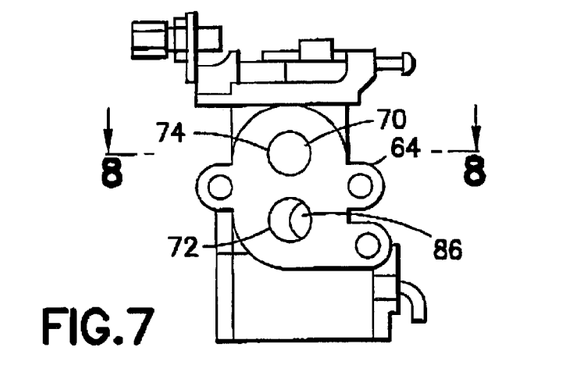
FIG. 7 is an elevational view of the inlet side of the fuel and air supply unit shown in FIG. 3 with the throttle valve assembly at a first intermediate position.
Figure 10:
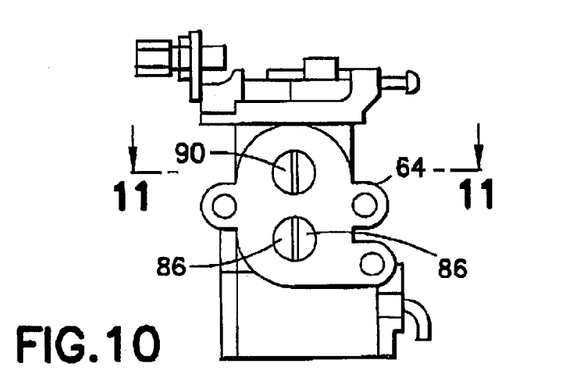
FIG. 10 is an elevational view of the inlet side of the fuel and air supply unit shown in FIG. 3 with the throttle valve assembly at a wide open throttle position.

As seen in comparing FIGS. 5, 7 and 10, the through hole 86 can be aligned and at least partially misaligned with the air/fuel channel 66 when the shaft 70 is rotated. FIG. 5 shows the shaft 70 of the throttle valve assembly 62 at an idle position. In this position the through hole 86 allows a limited flow area through the air fuel channel 66 for air to flow into the mixture passage 58 of the carburetor. As the shaft 70 is rotated the flow area allowed by the through hole 86 with the air/fuel channel 66 increases as the throttle valve assembly 62 is rotated towards a wide open throttle (WOT) position.

As seen best in FIG. 6, the second valve section 74 generally comprises an air bleed hole 88 and a second through hole 90. The air bleed hole 88 is angled relative to the second through hole 90. In the embodiment shown, the air bleed hole 88 intersects through the second through hole 90. FIG. 6 shows the throttle valve assembly 62 at the idle position as shown in FIG. 5. In the idle position the air bleed hole 88 is in communication with the front and rear sides of the air channel 68. Thus, the air bleed hole 88 allows a restricted air flow through the air channel 68. In the idle position, the second through hole 90 is not in direct communication with the air channel 68. Thus, air is not allowed to flow through the opposite open ends of the second through hole 90. Air is only allowed to flow through the air bleed hole 88.

Figure 8:
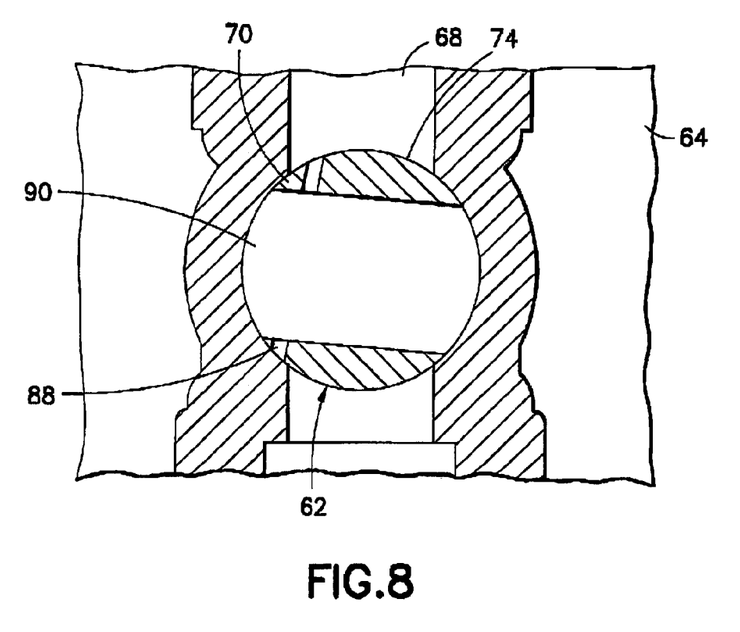
FIG. 8 is a cross sectional view of the fuel and air supply unit shown in FIG. 7 taken along line 8—8.

Referring now also to FIGS. 7 and 8, the throttle valve assembly is shown rotated to a first intermediate position (between the idle position and the wide open throttle position). In this intermediate position the shaft 70 has been rotated such that neither the air bleed hole 88 nor the second through hole 90 are in direct communication with the front side of the air channel 68. Thus, the shaft 70 blocks the path between the front and rear sides of the air channel 68 to substantially prevent air from flowing through the air channel 68. However, as seen in FIG. 7, the passageway provided by the first through hole 86 at the air/fuel channel 66 is increased. Thus, as the throttle valve assembly 66 is moved from its idle position in a direction towards the wide open throttle position, flow area through the air/fuel channel 66 is increased, and flow area through the air channel 68 is decreased; at least at the first intermediate position.

Figure 9:
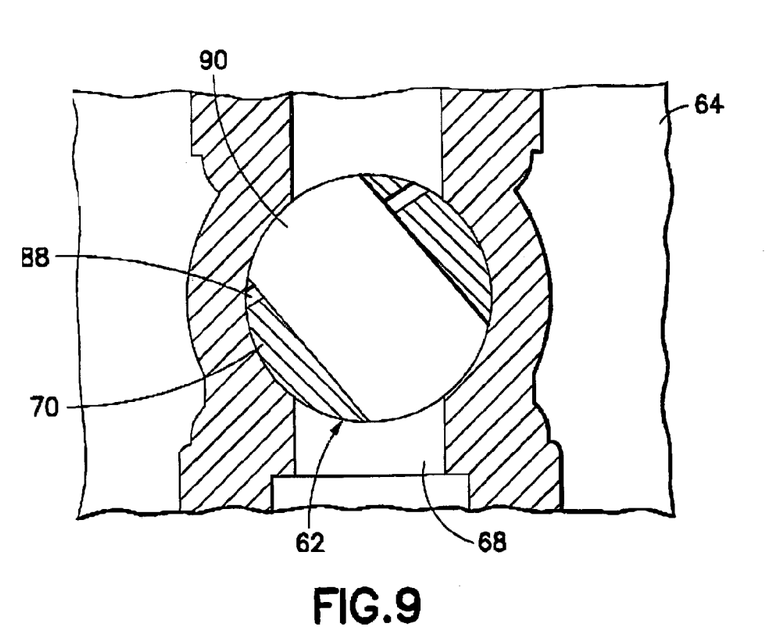
FIG. 9 is an elevational view of the inlet side of the fuel and air supply unit shown in FIG. 3 with the throttle valve assembly at a second intermediate position.

Referring now also to FIG. 9, the carburetor is shown with the throttle valve assembly 62 rotated to a second intermediate position; closer towards the wide open throttle position than the first intermediate position shown in FIG. 8. As the throttle valve assembly 62 is moved away from the first intermediate position shown in FIG. 8, the second through hole 90 comes into direct communication with the front and rear sides of the air channel 68. This opens a flow path for air to flow through the air channel 68.

Figure 11:
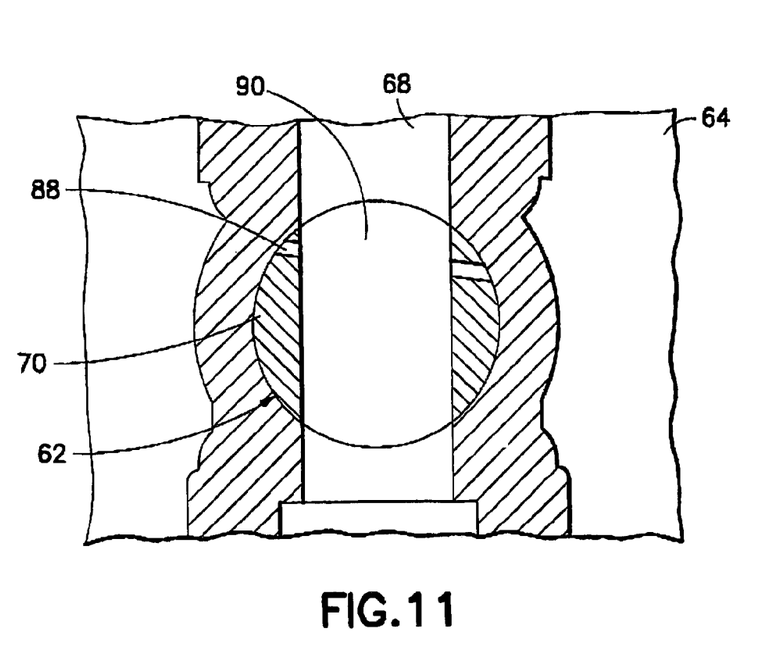
FIG. 11 is a cross sectional view of the fuel and air supply unit shown in FIG. 10 taken along line 11—11.

Referring also to FIGS. 10 and 11, the carburetor is shown with the throttle valve assembly 62 rotated to the wide open throttle position. In this position the second through hole 90 is aligned with the air channel 68 to provide a maximum flow path between the shaft 70 and the frame 64 at the second valve section 74. The first through hole 86 is also aligned with the air/fuel channel 66 to provide a maximum flow path between the shaft 70 and the frame 64 at the first valve section 72.

Figure 12:
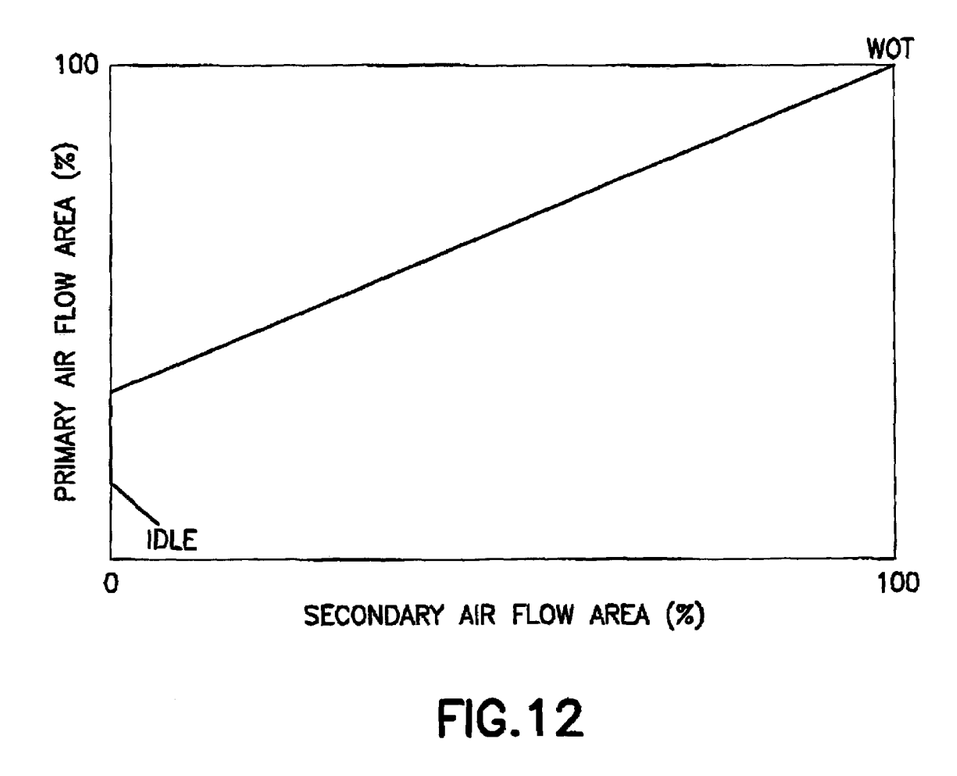
FIG. 12 is a chart showing the percentage of open flow area at the first valve section (the primary air flow area at the left scale) verses the percentage of open flow area at the second valve section (the secondary air flow area at the bottom scale) between the idle position and the wide open throttle position of the throttle valve assembly.

Referring now also to FIG. 12, a chart is shown showing the percentage of open flow area at the first valve section 72 (the primary air flow area at the left scale) verses the percentage of open flow area at the second valve section 74 (the secondary air flow area at the bottom scale) between the idle position and the wide open throttle position of the throttle valve assembly 62. The percent of primary flow area through the first valve section 72 increases as the throttle valve assembly 62 and shaft 70 are moved from the idle position to the wide open throttle position.

The percentage of secondary flow area through the second valve section 74 decreases as the throttle valve assembly and shaft 70 are moved from the idle position to the first intermediate position. In the first intermediate position the secondary air flow area is substantially closed. The percentage of secondary flow area through the second valve section 74 then increases as the throttle valve assembly is moved from the first intermediate position towards the second intermediate position closer to the wide open throttle position. The percentage of secondary flow area through the second valve section 74 continues to increase as the throttle valve assembly 62 is moved to the wide open throttle position.

One of the unique features of the present invention lies in the ability to supply a fraction of total air to the transfer/scavenging passages 82, 83 for stratified scavenging during idling and, shutting it off during a transition from idle to about 30 percent throttle open. From about 30 percent to wide open throttle, the functioning of the throttle barrel continues similar to a regular double barrel carburetor. The flow area for the secondary air drops to zero as the throttle is opened and stays at zero percent until about 30 percent throttle open.

While a first one of the valve sections allows an air/fuel mixture to flow through the first air/fuel channel, while a flow path of the first air/fuel channel is open between about 15–30 percent by the first valve section, the second valve section of the throttle valve assembly is adapted to substantially prevent air from flowing through the second air channel. The first and second valve sections can move in unison with each other relative to the frame. The first and second valve sections are preferably comprised of a single common member; the shaft 70.

It has been observed that when a large size main jet is used in a double barrel carburetor, the hydrocarbon emission is very high. When a small size jet or needle is adjusted for low emission at idle, the acceleration may become unsatisfactory. When a small air bleed is provided into the secondary air system, the hydrocarbon emission is significantly reduced. The same may be achieved by supplying lean (low CO %) air fuel ratio. However, the acceleration may be poor when the air fuel ratio is lean, particularly during transition from idle to wide open throttle.

The present invention, on the other hand, can provide a small air flow through the air bleed hole 88 when the carburetor is in an idle position, can close the air channel 68 after idle and subsequently open the air channel 68 as the shaft 70 of the throttle valve assembly 62 is moved away from an intermediate position towards the wide open throttle position. This allows for good acceleration as the carburetor is moved away from an idle position, but without the very high hydrocarbon emissions associated with a large size main jet.

Figure 13:
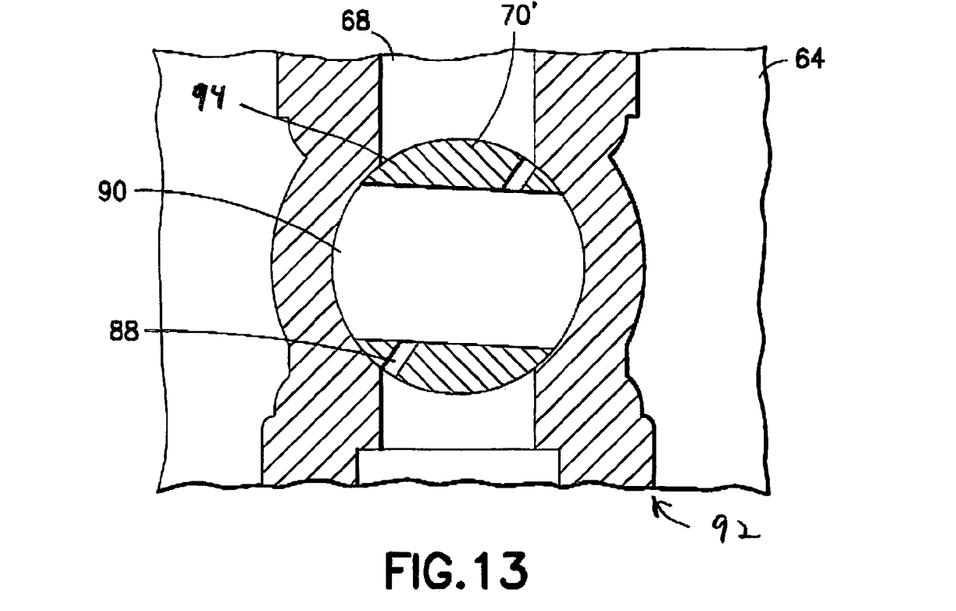
FIGS. 13–16 are cross sectional views of an alternate embodiment of a fuel and air supply unit shown with the throttle valve assembly in the same positions as shown in FIGS. 6, 8, 9 and 11, respectively.
Figure 14:
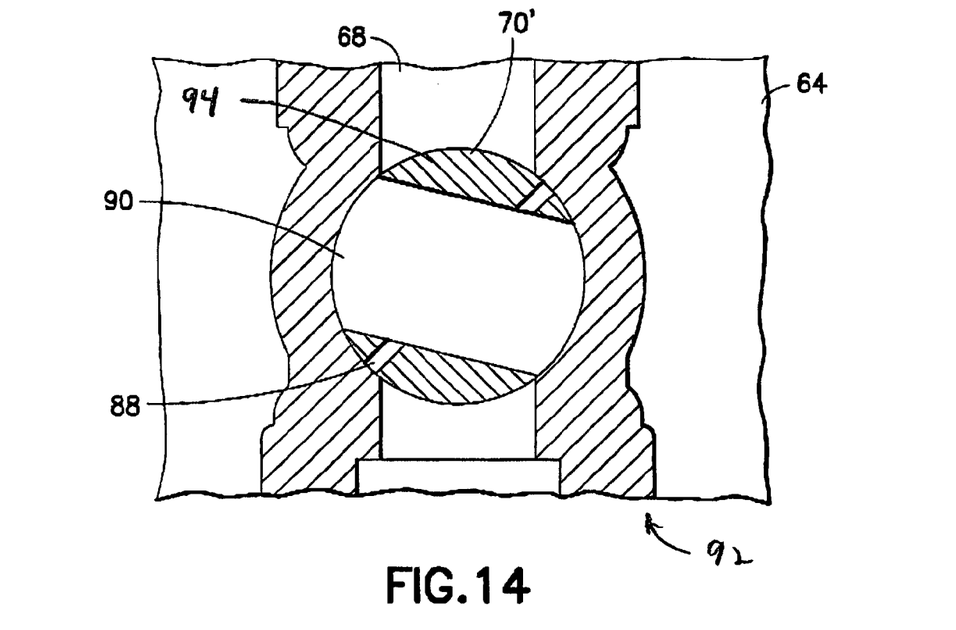

Referring now also to FIGS. 13–16, an alternate embodiment of the carburetor is shown. In this embodiment the carburetor 92 is substantially identical to the carburetor 54 described in reference to the first embodiment. However, in this embodiment the shaft 70' comprises a second valve section 94 wherein the air bleed hole 88 and the second through hole 90 are angled relative to each other at a different angle than the second valve section 74 shown in FIGS. 6, 8, 9 and 11. FIG. 13 shows the shaft 70' at the idle position of the throttle valve assembly. The air bleed hole 88 provides a path between the front and rear sides of the air channel 68. FIG. 14 shows the shaft 70' at the first intermediate position of the throttle valve assembly. In this first intermediate position both the air bleed hole 88 and the second through hole 90 are not in direct communication with the air channels 68. Thus, the shaft 70' blocks air flow through the air channel 68.

Figure 15:
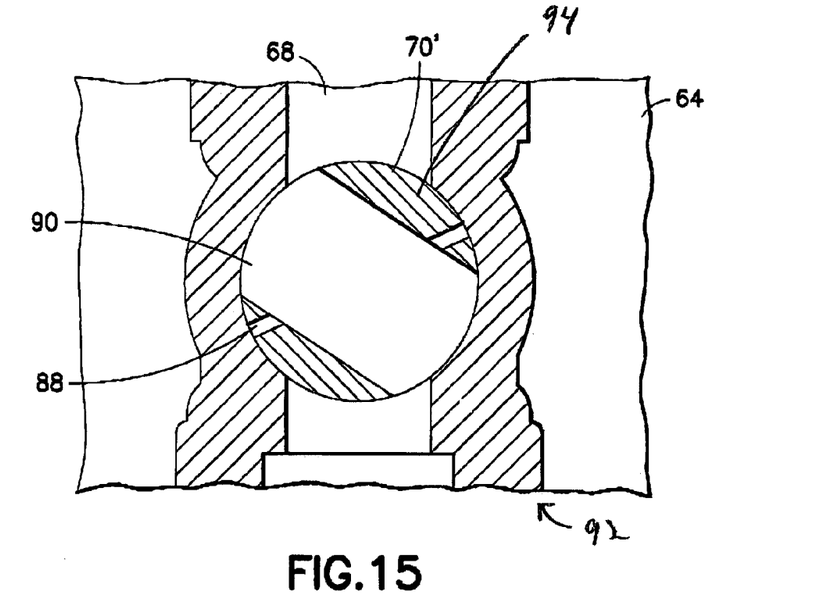
Figure 16:
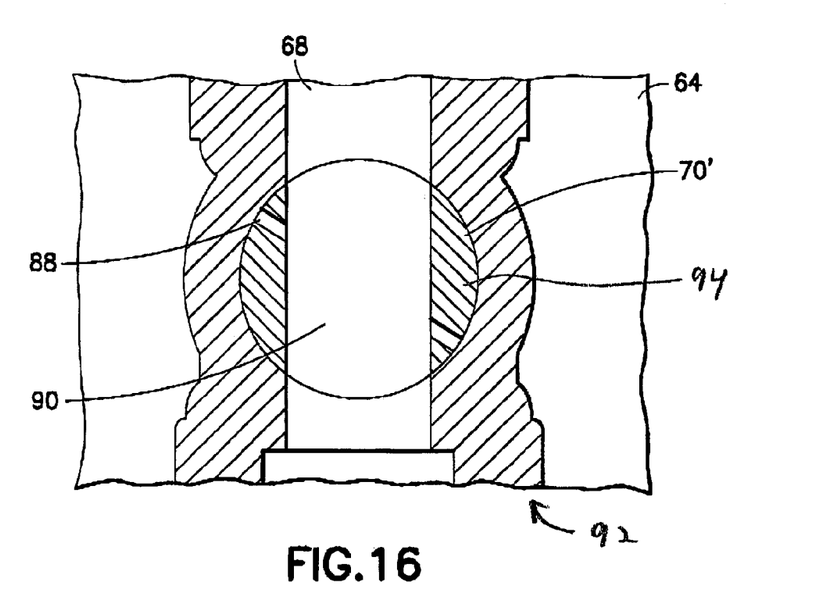

FIG. 15 shows the shaft 70' at the second intermediate position and FIG. 16 shows the shaft 70' at the wide open throttle position of the throttle valve assembly. In both of these positions the air bleed hole 88 is not in direct communication with the air channel 68. By keeping the air bleed hole closed at the downstream side, potential unequal distribution of secondary air into the air pipes 68a, 68b at the rear end of the air channel 68 is prevented.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A carburetor comprising:
   a frame comprising a first air/fuel channel and a second air channel; and
   a throttle valve assembly connected to the frame and having two valve sections, each valve section being located in a respective one of the channels, a second one of the valve sections having an air bleed hole therethrough,
   wherein the second valve section is movable relative to the frame from a first idle position to an intermediate closed position and then to a third open position at a wide open throttle (WOT), and wherein the air bleed hole allows flow through the second channel at the first idle position, but does not allow flow through the second channel when the second valve section is at the intermediate closed position.

2. A carburetor as in claim 1 wherein the throttle valve assembly comprises a shaft which forms the two valve sections, a first one of the valve sections comprising a first through hole extending through the shaft, and the second valve section comprising the air bleed hole and a second through hole extending through the shaft.

3. A carburetor as in claim 2 wherein the second through hole is in direct communication with the second channel only when the air bleed hole is not in direct communication with the second channel.

4. A carburetor as in claim 2 wherein the air bleed hole intersects with the second through hole.

5. A carburetor as in claim 1 wherein the throttle valve assembly comprises means for substantially blocking air flow to the engine through the second channel at the intermediate position of the valve assembly located between the idle position of the throttle valve assembly and the wide open throttle (WOT) position of the throttle valve assembly.

6. A carburetor as in claim 1 wherein the throttle valve assembly comprises means for reducing air flow through the second air channel as the throttle valve assembly is moved away from the first idle position, and subsequently increasing air flow through the second air channel as the throttle valve assembly is moved towards the wide open throttle (WOT) position.

7. A carburetor as in claim 1 wherein, while a first one of the valve sections allows an air/fuel mixture to flow through the first air/fuel channel while a flow path of the first air/fuel channel is open between about 15–30 percent by the first valve section, the second valve section of the throttle valve assembly is adapted to substantially prevent air from flowing through the second air channel.

8. A carburetor as in claim 7 wherein the first and second valve sections move in unison with each other relative to the frame.

9. A carburetor as in claim 7 wherein the first and second valve sections are comprised of a single common member.

10. A method of supplying air and an air/fuel mixture through a carburetor in an internal combustion engine, the method comprising steps of:
   locating a throttle valve assembly of the carburetor at an idle position, wherein air is allowed to flow through an air channel of the carburetor through an air bleed hole in the throttle valve assembly, and wherein the air/fuel mixture is allowed to flow through an air/fuel channel of the carburetor;
   moving the throttle valve assembly to an intermediate position, wherein air is substantially prevented from flowing through the air channel, and wherein the air/fuel mixture is allowed to flow through the air/fuel channel; and
   moving the throttle valve from the intermediate position towards a wide open throttle position wherein air is allowed to flow through the air channel through the throttle valve assembly.

11. A method as in claim 10 wherein the throttle valve assembly comprises two valve sections located in a respective ones of the channels, and wherein a second one of the valve sections comprises the air bleed hole and a second through hole, and wherein the step of locating the throttle valve assembly at the idle position provides the air bleed hole in communication with the air channel, but the second through hole is not provided in direct communication with the air channel.

12. A method as in claim 10 wherein the step of moving the throttle valve assembly to an intermediate position moves the second valve section such that the air bleed hole is not in communication with the air channel, and the second through hole is not in communication with the air channel.

13. A method as in claim 12 wherein the step of moving the throttle valve from the intermediate position towards a wide open throttle position moves the second valve section such that the air bleed hole is not in direct communication with the air channel, but the second through hole is in communication with the air channel.

* * * * *